(12) United States Patent
Öjerstav et al.

(10) Patent No.: US 10,050,425 B2
(45) Date of Patent: Aug. 14, 2018

(54) CABLE TRAY AND A METHOD OF PRODUCING SUCH A CABLE TRAY

(71) Applicant: SCHNEIDER ELECTRIC INDUSTRIES SAS, Rueil-Malmaison (FR)

(72) Inventors: Jan Öjerstav, Mora (SE); Rolf Wesgardh, Mora (SE)

(73) Assignee: Schneider Electric Industries SAS, Rueil-Malmaison (FR)

( * ) Notice: Subject to any disclaimer, the term of this patent is extended or adjusted under 35 U.S.C. 154(b) by 0 days.

(21) Appl. No.: 15/129,172

(22) PCT Filed: Mar. 27, 2014

(86) PCT No.: PCT/EP2014/056180
§ 371 (c)(1),
(2) Date: Sep. 26, 2016

(87) PCT Pub. No.: WO2015/144228
PCT Pub. Date: Oct. 1, 2015

(65) Prior Publication Data
US 2017/0104319 A1 Apr. 13, 2017

(51) Int. Cl.
*H02G 3/04* (2006.01)
(52) U.S. Cl.
CPC ............. *H02G 3/0456* (2013.01); *H02G 3/04* (2013.01)

(58) Field of Classification Search
None
See application file for complete search history.

(56) References Cited

U.S. PATENT DOCUMENTS 2,917,259 A   12/1959   Hill

FOREIGN PATENT DOCUMENTS

| DE | 74 31 021 U | 12/1974 |
| DE | 88 06 121 U1 | 9/1988 |
| GB | 1 292 997 A | 10/1972 |
| RU | 85269 | 7/2009 |

OTHER PUBLICATIONS

International Preliminary Report on Patentability regarding PCT/EP2014/056180, dated Jul. 25, 2016, 29 pps.
International Search Report regarding PCT/EP2014/056180, dated Nov. 21, 2014, 4 pps.

*Primary Examiner* — Dimary Lopez-Cruz
(74) *Attorney, Agent, or Firm* — Foley & Lardner LLP

(57) ABSTRACT

Claimed by the inventions is a cable tray (23, 140) comprising a first part (51) constituting one piece having a uniform thickness, the first part (51) forming at least a first support surface (52) of a first accommodation (53) for the plurality of cables (54), the first part (51) having a plurality of first through holes (15) formed by a first plurality of edges (19) in the first part (51), wherein at least a part of each said edge (19) protrudes and is directed with an angle away from the support surface (52) of the first accommodation (53), where $45° < \delta < 180°$. Also a method of manufacturing such a cable tray is claimed by the invention.

20 Claims, 5 Drawing Sheets

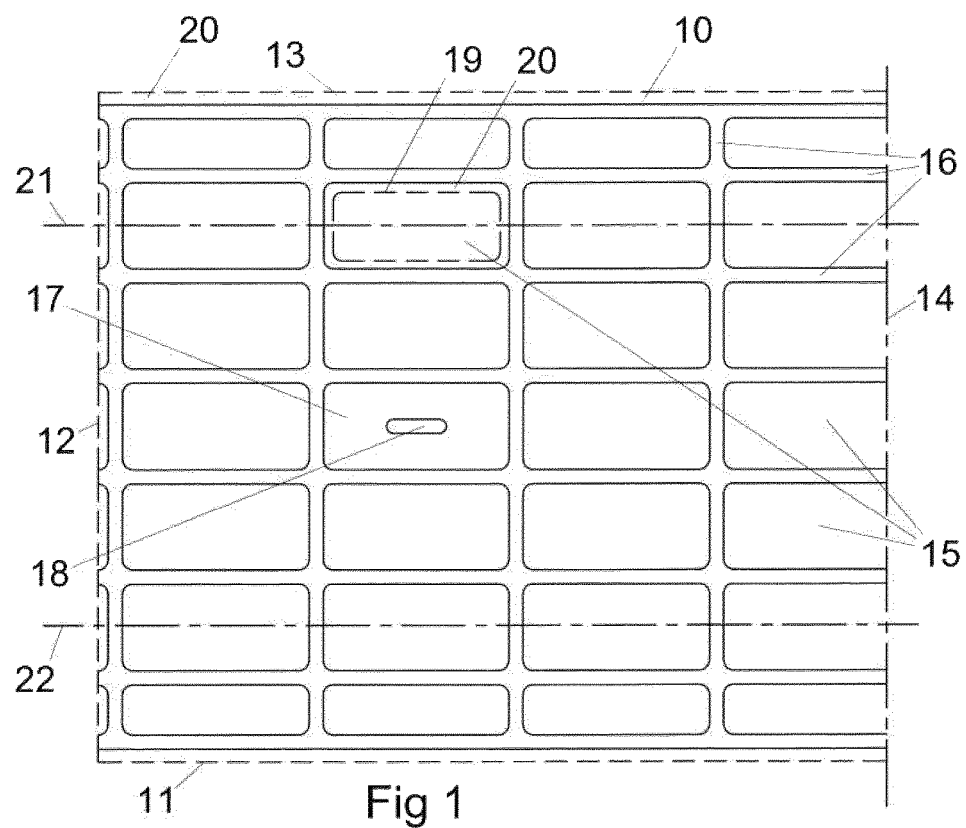
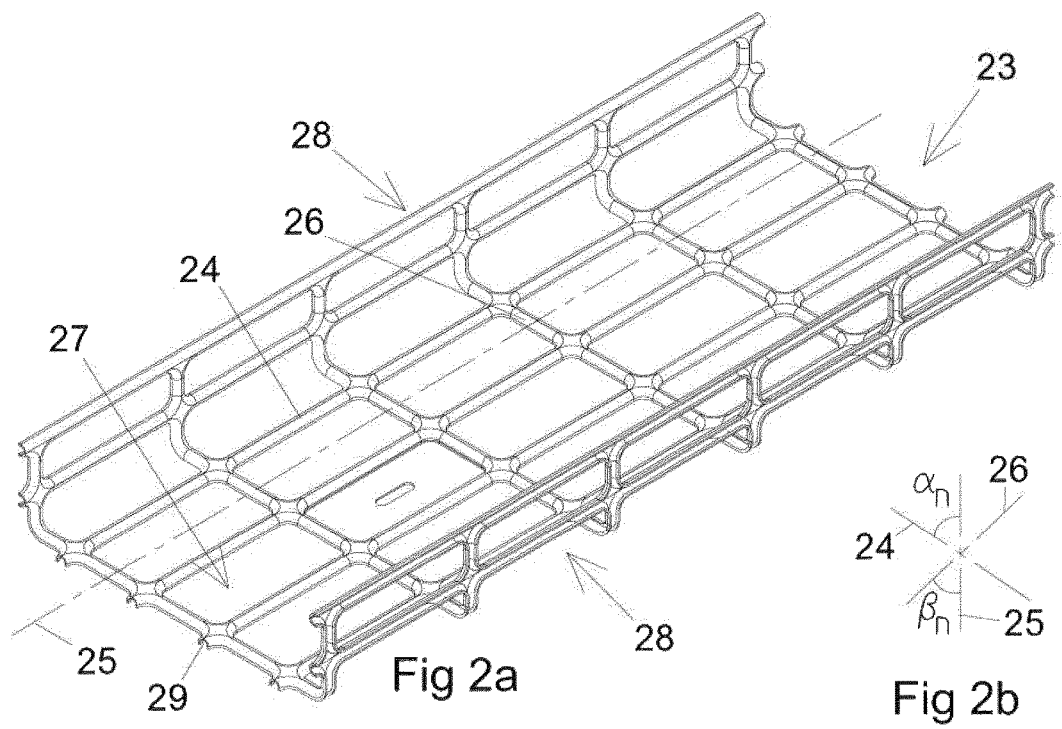
Fig 1
Fig 2a
Fig 2b

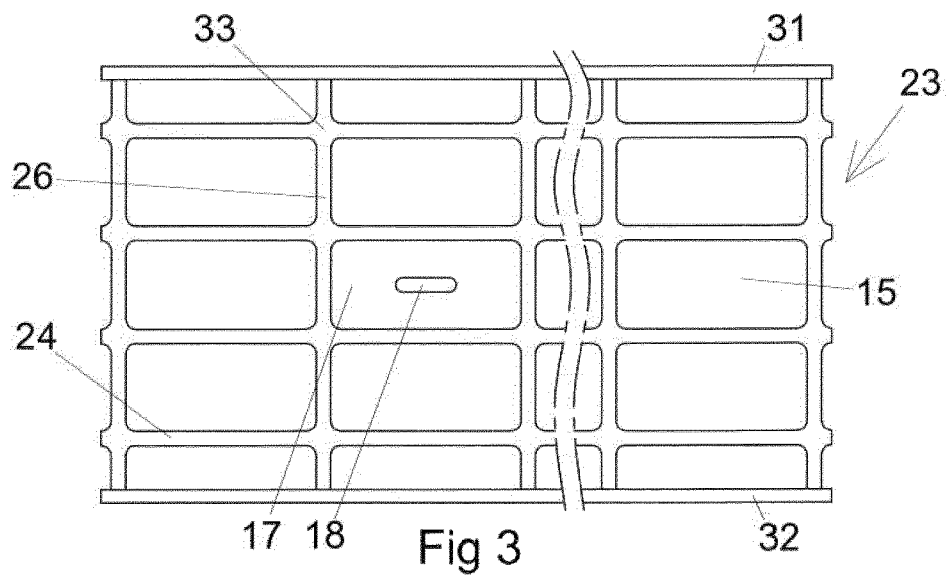
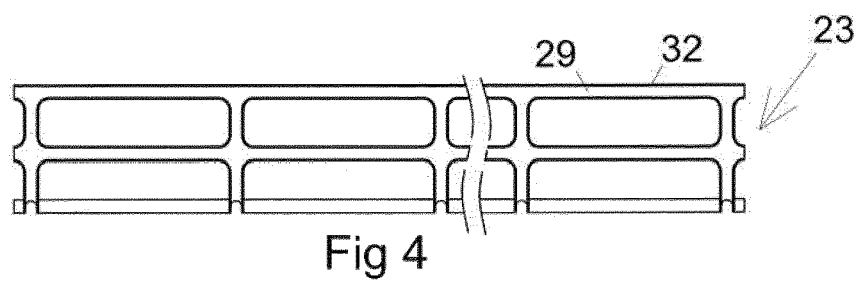
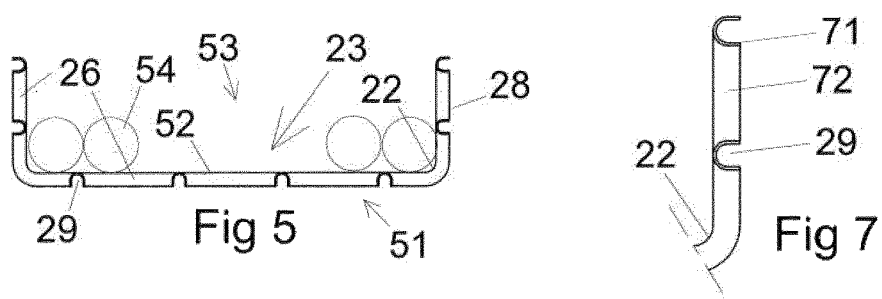
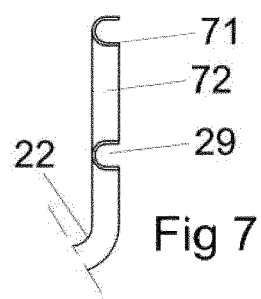
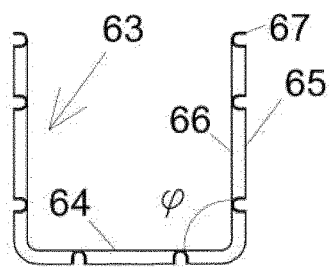
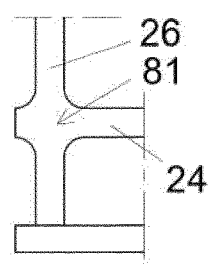
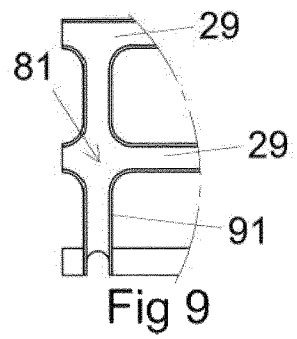

CABLE TRAY AND A METHOD OF PRODUCING SUCH A CABLE TRAY

CROSS-REFERENCE TO RELATED APPLICATIONS

The present Application is a U.S. national entry stage of, and claims priority to, and the benefit of, International Application No. PCT/EP2014/056180, filed on Mar. 27, 2014. International Application No. PCT/EP2014/056180 is incorporated herein by reference in its entirety.

TECHNICAL FIELD

The present invention relates to the field of cable trays and cable ladders for supporting electric cables and wires.

BACKGROUND OF THE INVENTION

Cable trays of the wire type are previously well known and these are also known as wire trays since they are produced from separate wires which have been welded or soldered together in perpendicular angles towards each other. Such conventional wire trays are for example disclosed in the document WO 2005/090846.

Since the production of such wire trays requires a welding or soldering process the time of production is comparatively long and therefore also costly. Also the weight of such conventional wire trays is comparatively high since the wires are of a homogeny metallic material.

In the technical field of cable trays there are also previously known trays with bent longitudinal side bars and perforated bottoms, for example such as those known by GB 1292997. These types of cable trays which are punched and bent from a flat sheet of material do not provide enough flexural rigidity, neither in the transversal direction not in the longitudinal direction, for heavy cable and wires.

OBJECT OF THE INVENTION

One object of the invention is to provide a new type of one piece cable tray.

A further object is to provide such a new type of cable tray having approximately the same physical properties such as "wire" diameter, dimensions and bending strength as conventional wire trays.

A further object of the invention is to provide such a new type of cable tray which can be more rapidly and more cost effectively produced.

Also an object of the invention is to produce such a cable tray that is lighter than previously known wire trays.

An object is also to produce such a new type of cable tray from a steel coil.

A further object of the invention is to provide such a new type of cable tray having a plurality of first through holes formed by a first plurality of edges directed and protruding with an angle away from a support surface in the cable tray.

DISCLOSURE OF THE INVENTION

These objects are achieved by means of the present invention as defined in the accompanying independent patent claims. Suitable further embodiments of the invention will be apparent from the accompanying dependent claims.

In the following description the terms "cable tray" covers "mesh trays" having holes over the whole bottom as well as over the whole sides; and trays having holes in their sides but with a continuous bottom with no holes; and it also cover trays having holes over the whole bottom but with continuous sides with no holes.

The invention relates to a cable tray for the support of a plurality of cables which cable tray comprising a first part constituting one piece having a uniform thickness. This first part can for example be either seen as a bottom or as a side of the cable tray. Alternatively this one piece can be seen as a combination of bottom and sides in a semi-circular form of a cable tray. This first part contains at least a first support surface of a first accommodation for the plurality of cables. The first part having a plurality of first through holes formed by a first plurality of edges in the first part. At least a part of each said edges protrudes and is directed with an angle $\delta$ away from the said first support surface of the first accommodation. Specifically the angle is $45°<\delta<180°$.

In one embodiment of the invention the complete edge of at least one through hole in the cable tray having the angle $\delta$ from the said support surface.

In one embodiment of the invention the complete edge of at least two adjacent through holes in the first part having the angle $\delta$ from the said support surface.

In one embodiment of the invention the said angle is $60°<\delta<90°$, preferably $60°<\delta<80°$.

In one embodiment of the invention the said angle is $\delta=90°$. This embodiment might be the most common since it is the largest angle that can be produced with only one bending/stretching operation.

In one embodiment of the invention the said angle is $90°<\delta<120°$, preferably $100°<\delta<120°$. These angles might require more than one production step but the result is cable trays for specific purposes.

In one embodiment of the invention the said angle is $120°<\delta<180°$, preferably $130°<\delta<180°$ so that edges from two adjacent holes points towards each other. When the angle is $180°$ and the legs are curved a cylindrical cross section is achieved.

In one embodiment of the invention said through holes are formed and located in relation to each other so that the said edges of two adjacent through holes defines a tray member formed as a beam with longitudinally uniform shaped cross section which beam is provided with two legs connected by a web part, at least partly between adjacent located holes.

In one embodiment of the invention the support surface of said tray member is formed with a groove along the tray member. This groove is preferably symmetrically located on the tray member.

In one embodiment of the invention the support surface of said tray member is formed with a ridge along the tray member. This ridge is preferably symmetrically located on the tray member.

In these two last indicated embodiments, both the groove and the ridge are facing towards the accommodation for the cables in the cable tray.

In one embodiment of the invention said first part comprises at least one side part of said one piece. This side part having an angle $\varphi$ towards the said first part and defining a second support surface of said accommodation for the plurality of cables, where $30°\leq\varphi\leq140°$. The smaller angles are suitable for V-shaped cable trays and the larger angles are suitable for cable trays having a flat bottom and two flat side parts.

In one embodiment of the invention this side part is provided with a longitudinally extending cable tray edge which protrudes and is directed with an angle $\gamma$ away from a support surface of the first accommodation, where $70°\leq\gamma\leq 270°$. The support surface can be one side of a V-shapes cable tray or a side part of a U-shaped cable tray.

In one embodiment of the invention the first longitudinally extending cable tray edge is at least partly curved outwards from the said accommodation.

In one embodiment of the invention the first longitudinally extending cable tray edge is provided with a second longitudinally extending cable tray edge further bent so that the cable tray edge at least is directed towards the said accommodation.

The invention also relates to a cable tray having a tray bottom as the first support surface and tray sides as side parts which bottom and/or sides comprising first tray members extending at a first angle $\alpha_n$ towards the longitudinally direction of the cable tray and second tray members extending at a second angle $\beta_n$ towards the longitudinally direction of the cable tray. The first tray members and the second tray members are permanently connected to each other. The first and second tray members together define at least a tray bottom or at least tray sides. Each tray member is formed as a beam having a cross section in the form of a U-profile. Any kind of cable trays having this type of tray members will have a light weight in combination with high bending strength. One embodiment under the invention is that the angles consisting of two different angles $\alpha_1$ and $\beta_1$ between the respective tray member and the longitudinal direction of the cable tray both are 45°. Realistic numbers for the index n is $1\leq n\leq 3$.

In one embodiment of the invention the open side of the U-profiled beams is oriented towards the outside of the tray. Such an embodiment will eliminate the risk of damaging the isolating cover of an electrical cable since a smooth surface of the tray is faced towards the cables.

In one embodiment of the invention the cable tray is provided with a flat bottom and flat sides which bottom and/or sides comprises the said first tray members and the said second tray members. This embodiment involves main shapes of the cable tray being formed by a final bending operation along two parallel bending lines. Such a straight line bending operation is easy to perform and can be made with any conventional bending machine. However the tray members might not only together define a flat bottom surface but the tray members can be curved in order to define tray member ridges or bulbs on the otherwise flat bottom surface, for example to provide side stop means for the cables in the cable tray. The invention also cover embodiments in which the first tray members provides a different bottom level than the second tray members, for example the first tray members defines a higher bottom surface than the second tray members thereby defining ridges holding the electrical cables in firm lateral position in the cable tray.

In one embodiment of the invention only the bottom of the cable tray is provided with the said first tray members and said second tray members. The sides of the cable tray in this embodiment might be in the form of flat side surfaces either parallel to each other or angled towards each other.

In one embodiment of the invention only the sides of the cable tray is provided with the said first tray members and said second tray members. In such an embodiment the bottom might be formed as a flat surface covering the whole bottom area.

In one embodiment of the invention the cable tray is provided with parallel extending sides.

In one embodiment of the invention the cable tray is provided with flat sides connected to each other in a V-shape which sides comprises the said first tray members and the said second tray members. Such an embodiment does not have any regular bottom part since the sides are connected directly to each other.

In one embodiment of the invention the cable tray is provided with a curved bottom and curved sides together defining a semi-circular shape which bottom and sides comprises the said first tray members and the said second tray members.

In one embodiment of the invention the cable tray is provided with through holes each of which is limited by two opposing first tray members and by two opposing second tray members. These holes can be of any form/shape but they are limited by the said tray members.

In one embodiment of the invention the smallest width of the smallest hole has a width that is larger than the width of any tray member. In this embodiment the holes can be of different sizes but large enough to be produced by a punching and forming process. Preferably the sizes of the holes compared to the sizes of the tray members corresponds almost to the sizes of a conventional wire tray in which the length of a hole can be 20 times the diameter of the wires. In the present embodiment the preferred length of the hole is in the range of 5-25, preferably 15 times larger than the width of any tray member.

In one embodiment of the invention all tray members has approximately the same cross sectional form and cross sectional size.

In one embodiment of the invention the first tray members has a longitudinally elongation and the second tray member has a transversally elongation so that the said first angle $\alpha_1$ equals to approximately 0° and that the said second angle $\beta_1$ equals to approximately 90°. In this embodiment the form of the through holes are preferably rectangular but can also be quadratic.

In one embodiment of the invention at least one hole are of a rectangular form with two opposing long sides and two opposing short sides. The sizes of the long sides are of approximately double length in relation to the short sides.

In one embodiment of the invention the size and the form of the through holes are identical for a main part of the holes, particularly in the tray bottom.

In one embodiment of the invention at least one through hole is provided with a cover member either as part of the beam material or as an attached demountable cover member. Preferably the cover member is produced at the same time as the rest of the cable tray, i.e. at a punching and forming operational production step. In such an embodiment the cover member will be as a result of that a hole is not punched. Another type of cover member is a demountable cover member for which for example attachment grooves or flanges are formed in the material at the forming process. Such a cover member can be provided with various types of mounting means, such as mounting holes or attached mounting details. Such cover members can also be arranged in the sides and/or in the bottom of the cable tray. Providing a cable tray according to the invention makes it possible to easily and convenient produce or attach cover members to the cable tray for various purposes. A purpose for such cover members is to provide for cable tray mounting means.

In the embodiments of the invention both types of tray members defining the cable tray are produced in the same one single sheet of metal, preferably from a steel coil.

In embodiments of the invention the production method of the cable tray involves a punching and forming operation as well as a bending operation.

The invention also covers a method of manufacturing a cable tray. For example such cable trays specially adapted for supporting electrical wires. In this manufacturing method a flat metal sheet starting material having one side surface as a support surface side for an accommodation for a plurality of cables is being processed by the following production steps:

a) the metal sheet material is being punched with a plurality of through holes having a plurality of edges;

b) bending at least a part of said edge an angle δ away from the support surface;

c) bending the formed material into a final form of the cable tray.

An embodiment to the method of procedure is that the metal sheet material is punched with holes which are separated by strips;

and that in step b) the strips are being by the bending procedure formed into U-shaped beams defined as tray members;

In one embodiment of the manufacturing method step c) involves bending the formed material a pre-defined angle along at least one bending line being parallel to the longitudinal direction of the cable tray. Such a manufacturing step will result in cable trays having either a V-form or a U-form with a flat bottom.

In one embodiment of the manufacturing method step a) and step b) is a simultaneously combined processing step, which means that punching and bending is being made simultaneously in a single production step. The bending and/or forming process also involves pressing and plastically stretching the material.

In one embodiment of the manufacturing method the final form of the cable tray being surface treated. This surface treatment involves often coating with zinc by a galvanizing process.

BRIEF DESCRIPTION OF THE DRAWINGS

The invention will now be described in more detail with reference to exemplifying embodiments thereof illustrated in the accompanying drawings, in which FIG. 1 illustrates a manufacturing step of an embodiment according to the present invention;

FIG. 2a discloses a perspective view of a part of a first product produced under the manufacturing step of FIG. 1;

FIG. 2b discloses a schematic view of angles for the tray members;

FIG. 3 illustrates a top view of the product according to FIG. 2;

FIG. 4 illustrates a side view of the product in FIG. 3;

FIG. 5 illustrates an end view of the product in FIG. 3;

FIG. 6 illustrates and end view of a second product according to the invention;

FIG. 7 illustrates an enlarged end view of the top part of the product in FIG. 5;

FIG. 8 illustrates an enlarged top view of a top corner part of the product in FIG. 3;

FIG. 9 illustrates an enlarged side view of the end part of the product in FIG. 4;

DESCRIPTION OF THE INVENTION

Figure 10A:
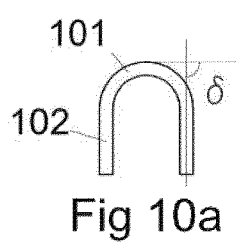
FIG. 10a-d illustrates various cross shapes of beams defining the tray members.

FIG. 1 illustrates a flat starting metal sheet material 10 disclosed in the figure by the border of the dashed lines 11, 12, 13 and the center type line 14. From this flat metal sheet material a first step being a punching operation will take place in order to form the actual type of a cable tray product. In the embodiment disclosed in FIG. 1 the product will be a cable tray which corresponds to prior known wire trays. The punching operation produces a plurality of through holes 15 over almost the entire metal sheet surface leaving strips 16 of the sheet material as borders between all the holes 15 and along each side of the sheet material. All strips have the same width after this punching operation. As can be seen in the figure the punching operation also can produce a cover member 17 closing off one "hole", which cover member 17 also can be provided with a mounting hole 18 in the punching operation. The cover member 17 can be made either as a non-punched area or as a specially punched hole defining ridges and/or grooves for attaching a later provided cover member. Thus, FIG. 1 discloses twenty-one holes and seven holes crossed by the center type line 14. One of these twenty-one holes is covered by the cover member 17. However the number and sizes of the holes can be combined and varied in order to serve various needs of a complete cable tray product.

For clarity purposes of FIG. 1, only one hole 15 is illustrated just after the punching operation, in which the edges of the hole is disclosed by the dashed lines 19.

Thereafter a second step defined as a strip forming operation is taken place. During this strip forming operation the excess border material 20 along all holes and all edges are bent 90° in the same direction from the first support surface of the starting metal sheet surface. This strip forming operation contains both a bending operation and a plastic forming operation of the metal sheet. The result of the starting metal sheet material after these two steps is disclosed in the figure by the solid lines. As can be seen in later described embodiments the angle of the edges can be varied.

A third step being a bending operation along two bending lines 21, 22 each of which is parallel to the longitudinal elongation of the cable tray and which is indicated in FIG. 1 by the two center type lines.

The first step being a punching operation and the second step being a forming operation can be made in a single combined punching/forming operation step, however punching by making holes and forming by bending and stretching the edges will be made during such a combined step.

FIG. 2a discloses the resulting product of a first embodiment after the three forming steps of the invention indicated above. The resulting product being a cable tray 23 which corresponds to a previous known wire tray. In the figure the forming operation of the strips disclosed in FIG. 1 has now became first tray members 24 extending at a first angle α towards the longitudinally direction 25 of the cable tray 23 and second tray members 26 extending at a second angle β towards the longitudinally direction of the cable tray. The form of each tray member 24, 26 is as beams each of which having a cross section in the form of a U-profile 29 with the open side of the U-profile directed outwards from the cable tray 23. In this first disclosed embodiment the first angle α equals to approximately 0° and the said second angle β equals to approximately 90°. However other values of the angles α and β results in other types of holes in the cable tray and thus constitutes other embodiments of the invention. Other suitable values of the angles are 45° for both α and β.

In FIG. 2b the angles $α_n$ and $β_n$ to the longitudinally direction 25 of the cable tray has been defined in view to the direction of the first tray member 24, $α_n$ and in view to the direction of the second tray member 26, $β_n$. In this schematic figure the angles are approximately 45° for both $α_n$ and $β_n$. The index "n" represents further angles for first tray members and second tray members respectively.

In this invention it is also possible to have one set of angles for both α and β in the bottom part 27 of the cable tray and another set of angles for both α and β in the side parts 28 of the cable tray.

FIG. 3 discloses top view of the cable tray 23 with the beams in the form of first tray members 24 and second tray members 26. Also the cover member 17 and its mounting hole 18 can be seen in the figure. Cover member/members with the respective mounting hole can of course be located in one or more of the holes located on the side parts of the cable tray. Other types of attaching means for various devices than mounting holes can be provided in the cover member. As is recognized from this top view is that the U-shaped beams are orientated so that the open side of the beam cannot be seen in a top view of the cable tray. This is also a fact concerning top side longitudinally directed beams 31, 32 in which the open side of the U-shaped beams is directed out from the cable tray. This orientation is important since it will avoid damaging the electrical cables supported by the cable tray. The holes 15 in the cable tray are in this embodiment rectangular. It is also clear from the figure by the curved center lines that cable trays according to the invention can be produced in different suitable lengths. The connections 33 between each first tray member 24 and each second tray member 26 are made as part of the members since the tray members are produced from the same sheet of metal.

FIG. 4 discloses a side view of the cable tray 23 where the top beam 32 is shown with its open side of the U-profile 29 from outside the cable tray.

FIG. 5 is an end view of the cable tray 23 in FIGS. 2a, 3 and 4 clearly disclosing that the longitudinally directed U-shaped beams having its open sides of the a U-profiles 29 directed outwards from the cable tray. The figure also discloses the second tray members 26 at the end of the cable tray. The sides of the cable tray have been formed by a 90° bend at both sides where one side part 28 has been bent along one of the longitudinally directed bending lines 22 disclosed in FIG. 1. The cable tray 23 has a first part 51 with a first support surface 52 of a first accommodation 53 for a number of cables 54.

FIG. 6 discloses an end view of a second embodiment of a cable tray 63 according to the invention which cable tray 63 has been formed according to the previous described steps from an identical starting metal sheet material as disclosed in FIG. 1. What differs in this embodiment is that the two bending lines have been located closer to each other and therefore this cable tray have a closer bottom part 64 and longer side parts 65 having a second support surface 66 facing towards the accommodation, i.e. the proportions of the bottom and the sides has been changed resulting in a new product only by changing the location of the bending lines 21, 22 disclosed in FIG. 1. In this figure the angle φ between the first part, here the bottom part 64, and one side part 65 is 90°. The end of the side part is provided with a longitudinally extending cable tray edge 67 which protrudes and is directed away from the first support surface 66 of the first accommodation.

FIG. 7 discloses in an enlarged view the top part of one side from FIG. 5. The longitudinal beams with their U-profile 29 are arranged with their open sides facing outwards from the cable tray. The profile sides 71 of the longitudinally beams being the first tray members is attached or is a part of the profile sides 72 of the crossing and transversally extending beams being the second tray members. These second tray members have been bent at the bending line 22 as previously described.

FIG. 8 disclose in an enlarged top view the connection area 81 between first tray members 24 and second tray members 26. As can be seen the connection between the said members is made from the same metal sheet material so in the connection area the beams is continuously converted into each other for smooth connection surfaces. Thus, there are no level differences, neither vertically nor horizontally, between the different tray members 24, 26. This connection area 81 between the tray members is the result of the punching and forming operation steps in producing a cable tray according to the invention.

FIG. 9 discloses an outside view of a corner of the cable tray. In this view the inside of the U-profiles 29 are shown which at the connection area 81, the surfaces of the U-profiles are smooth and connected to each other in the same way as can be seen from the outside. Also the edges 91 of the U-profiles 29 run continuously from one beam to another crossing beam.

In the FIGS. 10a-13c various cross shapes of beams and side edges are disclosed where FIG. 10a discloses the cross shape of a beam both provided longitudinally and transversally in the cable tray previous described as a U-profile. This cross shape discloses a beam that has a curved web 101 and parallel legs 102. This design of a beam is a design that can be used in all embodiments for a beam between two adjacent through holes in the respective first part of each of the embodiments of the cable tray.

Figure 10B:
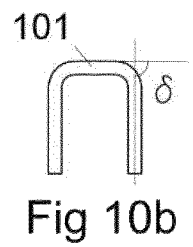

FIG. 10b discloses a similar cross shape but in which the web 101 has a flat surface as a support surface facing towards the cables.

Figure 10C:
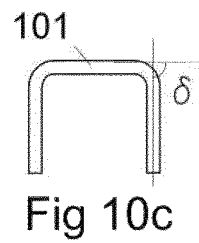

FIG. 10c discloses a similar cross shape but in which the web 101 is longer than in FIG. 10b giving the cables a larger support surface.

Figure 10D:
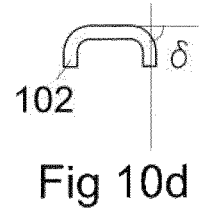

FIG. 10d discloses a similar cross shape as disclosed in FIG. 10b but having shorter legs 102.

In these four embodiments the angle δ between the support surface, represented by the outer surface of the web in the figures facing the first accommodation, and the direction of the parallel legs is 90°. The end of these legs seen in the cross section of the beam is the same as the side edges of the respective through hole.

Figure 11A:
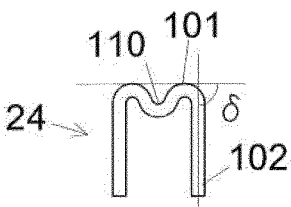
FIG. 11a-c illustrates further various cross shapes of beams defining the tray members.
Figure 11B:
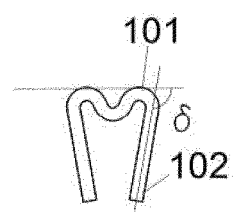
Figure 11C:
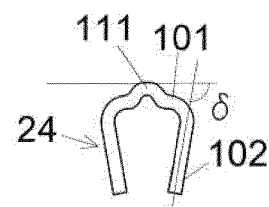

In the FIGS. 11a-11c variations of the embodiment disclosed in FIG. 10b are disclosed. These variations are in FIG. 11a-11b provided with a groove 110 arranged centrally in the web 101 and directed along the tray member 24. As in FIG. 10b the angle δ between the support surface represented by the web and the direction of the leg 102 of the beam is 90°.

FIG. 11b discloses an embodiment similar to the embodiment disclosed in FIG. 11a but having a further bending of the legs 102 away from the support surface represented by the web 101. Here the angle δ is approximately 115°. For such an angle the punching for bending the edges of the holes might be made from both sides of the cable tray body.

FIG. 11c discloses a corresponding embodiment to the embodiment disclosed in FIG. 11b, but instead of providing the web 101 with a groove the web is provided with a ridge 111 along the tray member 24. Also in this embodiment the angle δ is approximately 115°.

Figure 12A:
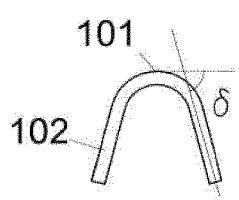
FIG. 12a-d illustrates other types of various cross shapes of beams defining the tray members.

In the embodiments disclosed in the FIGS. 12a-12d indicating cross shapes of a beam which also can be both provided longitudinally and transversally in the cable tray. FIG. 12a corresponds to the embodiment disclosed in FIG. 10a but the angle δ between a leg 102 and the support surface 101 is less than 90° and in the figure disclosed the angle δ is about 70° for both legs 102.

Figure 12B:
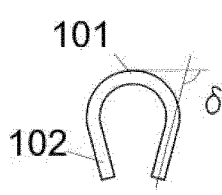

In FIG. 12b a further corresponding embodiment as in FIG. 10a/12a is disclosed but here the angle δ from the support surface 101 is about 110° for both legs 102.

Figure 12C:
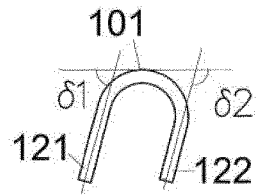

In the embodiment in FIG. 12c, a similar embodiment as in FIG. 10a is disclosed but in the present embodiment the legs of the beam has different angles $δ_1$, $δ_2$ between each leg 121, 122 and the support surface 101. In the embodiment disclosed, $δ_1$ is about 70° and $δ_2$ is about 110°.

Figure 12D:
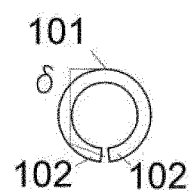

FIG. 12d discloses a further embodiment of a beam between adjacent holes which beam has been formed to a cylindrical shape. With the same definitions as previously used the angle δ for each tip of the legs are about 160-180°, which indicates that the tip of the legs are pointing towards each other.

Figure 13A:
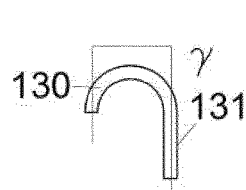
FIG. 13a-c illustrates various cross shapes of side part edges of a cable tray.
Figure 13B:
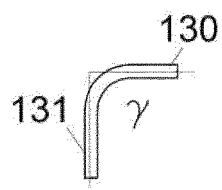
Figure 13C:
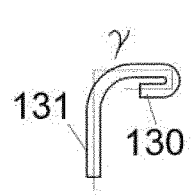

The FIGS. 13a-13c disclose various cross shapes of side part edges of a cable tray in which FIG. 13a discloses the cross shape of an edge 130 that is curved outwards from a support surface 131 of the side part. The edge is pointing away from the support surface by the angle γ. The edge is bent/curved and thus directed 180° from the support surface 131 of the side part, as can be seen by the line which is bent first 90° and then further 90° in the figure.

In the FIG. 13b the edge 130 of the side part is bent γ=90° away from the support surface 131.

In the FIG. 13c the edge is bent further 180° compared to the embodiment in FIG. 13b which means that the angle γ=90°+180°=270° between the edge 130 and the side support surface 131.

In all embodiments the dimensions of the web as well as the legs can be varied. And also all embodiments of the beams and side edges are formed from a one piece cable tray body by punching and plastically pressing and/or bending the sheet material into its final shape. When the beams are longitudinally extending in the cable tray then roller pressing is an advantageous forming method for the edges of the punched holes.

Figure 14:
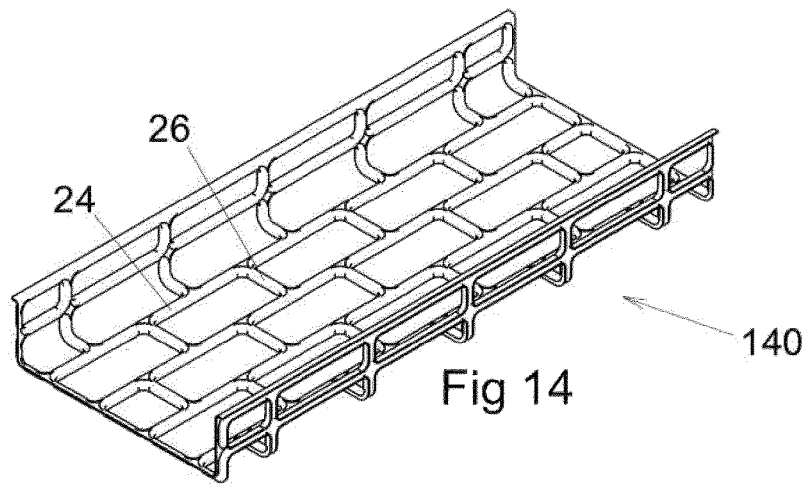
FIG. 14 discloses a perspective view of a part of a second product produced under the manufacturing step.

In FIG. 14a further embodiment of a cable tray 140 according to the invention is disclosed. In FIG. 2a the cable tray 23 is disclosed having rectangular rows and columns of holes separated by the said tray members 24, 26. But in FIG. 14 the first cable tray member 24 extends along the whole length of the cable tray 140 while the second cable tray members 26 are not sideways aligned with each other but instead are longitudinally displaced in relation to each other. This will create a different embodiment of the cable tray 140.

Other different embodiments of the invention can be recognized and such examples are presented in the schematic FIGS. 15-18.

Figure 15A:
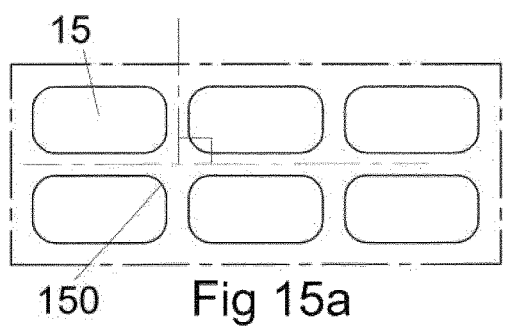
FIG. 15a-b illustrates various patterns of cable tray beams according to the invention.

FIG. 15a discloses an embodiment corresponding to FIG. 2a but in which the rounded corners 150 of the holes 15 has a larger radius than the embodiment disclosed in FIG. 2a. The angles α and β as defined in FIG. 2b are 0° and 90° respectively.

Figure 15B:
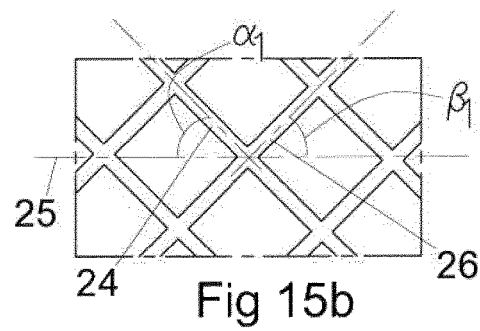

FIG. 15b discloses an embodiment corresponding to FIG. 2b in which the angles $α_1$ and $β_1$ between the first and second cable tray members 24, 26 respectively and the longitudinally direction 25 of the cable tray both are 45°.

Figure 16:
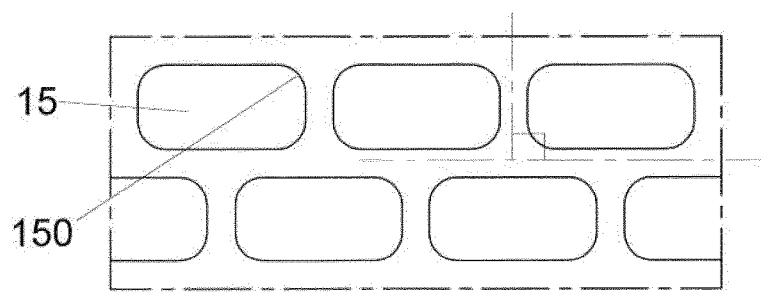
FIG. 16 illustrates a cable tray pattern corresponding to the cable tray in FIG. 14.

FIG. 16 discloses an embodiment corresponding to FIG. 14 but in which the rounded corners 150 of the holes 15 has a larger radius than the embodiment disclosed in FIG. 14. The angles α and β as defined in FIG. 2b are 0° and 90° respectively.

Figure 17:
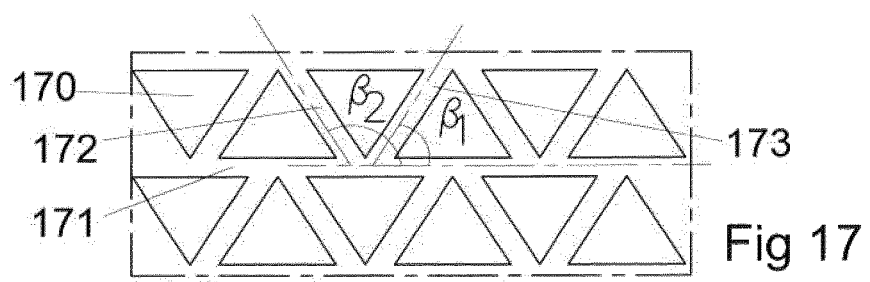
FIG. 17 illustrates a further pattern for the beams of a cable tray according to the invention.

FIG. 17 discloses an embodiment in which the holes 170 are made triangular which means that the beams are represented by first cable tray members 171, second cable tray members 172 and third cable tray members 173. As can be recognized from the FIG. 17 the angles α and $β_1$ respective $β_2$ as defined in FIG. 2b are 0°, 60° and 120° respectively.

Figure 18:
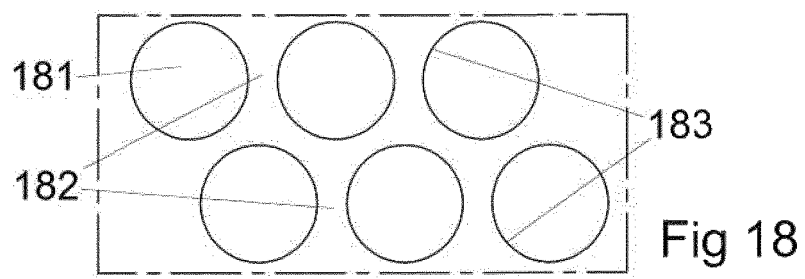
FIG. 18 illustrates a further pattern for the beams of a cable tray according to the invention.

FIG. 18 discloses an embodiment in which the holes 181 are made circular werein the areas between the holes no longer can be defined as beams but instead are identified as cable supporting areas 182. These areas have been made in the same way as the previously described beams, i.e. by punching the holes and plastically bending and/or stretching the supporting areas for the cables so that the edges 183 of the holes 181 are bent away from the supporting surfaces of the cable supporting areas 182 in the same manner as for the previously described holes.

Figure 19A:
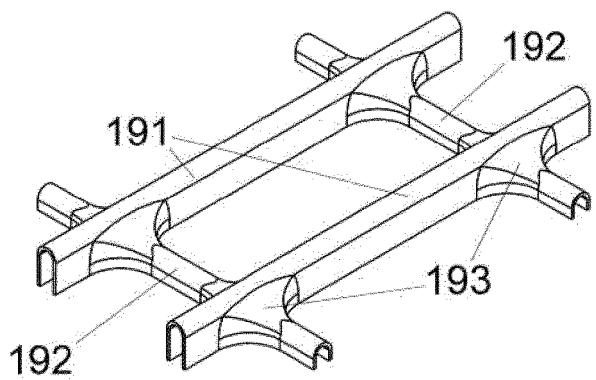
FIG. 19a-b illustrates a further embodiment of first and second crossing tray members.

FIG. 19a discloses a part of cable tray embodiment having parallel straight first tray members 191 and parallel straight second tray members 192 crossing each other at a perpendicular angle. The first tray members 191 together define a bottom surface having an elevated level of the cable tray compared to the bottom surface defined by the second tray members 192. Although the cable tray members 191, 192 define two different bottom levels of the cable tray the production method is the same as the method previously described. Thus, the beams defining the cable tray members 191, 192 have been pressed from a single piece of sheet material. In the crossing between a first tray member 191 and a second tray member 192 it is provided material extension zones 193 in which the sheet material have been plastically deformed at a larger degree than in the corresponding zones in the previous disclosed embodiments. The disclosed embodiment provides for lateral supporting ridges for the cables placed in the cable tray.

Figure 19B:
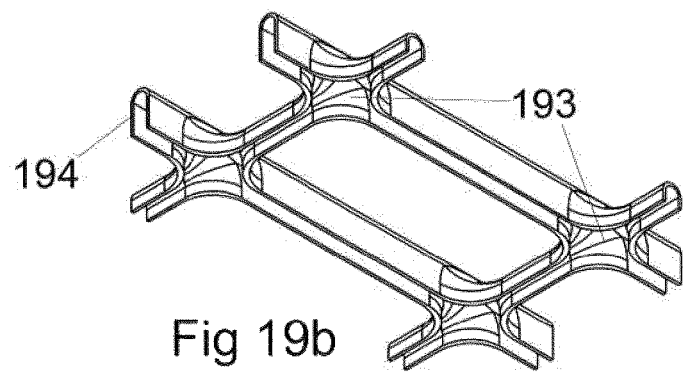

FIG. 19b discloses the same beam crossings as disclosed in FIG. 19a from an outside view below the cable tray. Each beam defines a U-shape 194 which is open towards the outside of the cable tray. Also the extension zones 193 are part of this U-shape which also are open towards the outside of the cable tray.

Further embodiments of the inventions are where the holes are formed elliptical or with other shapes and arranged in specific patterns over the first support surface of a first accommodation for the plurality of cables are also part of the invention.

As can be seen from the FIGS. 1, 2a, 3, 4, 8, 9 and 14 producing cable trays according to these embodiments of the present invention makes it also possible to cut the cable tray to a desired length near the connection areas of the tray.

The invention claimed is:
1. A cable tray comprising:
    a first part comprising one piece having a uniform thickness, the first part forming at least a first support surface of a first accommodation for the plurality of cables, the first part having through holes each defined in part by an edge of the first part, the through holes including at least one enclosed through hole defined by a plurality of protruding edges enclosing the at least one enclosed through hole and protruding from the first support surface;
  wherein the edge protrudes from the first support surface and is directed with an angle δ away from the first support surface of the first accommodation;
wherein 45°<δ<180°; and
wherein the edge of at least one of the through holes is oriented at the angle δ from the first support surface.

2. The cable tray according to claim 1, wherein the edge of at least two adjacent through holes in the first part is orientated at the angle δ from the first support surface.

3. The cable tray according to claim 1, wherein 160°<δ<180°, so that edges from two adjacent through holes are angled towards each other.

4. The cable tray according to claim 1, wherein the through holes are formed and located in relation to each other so that edges of two adjacent through holes define a tray member;
  wherein the tray member is formed as a beam with longitudinally uniform cross shape; and
  wherein the tray member is formed at least partly between adjacent located through holes.

5. The cable tray according to claim 1, wherein the first part comprises at least one side part of the one piece;
  wherein the at least one side part is angled towards the first part and defines a second support surface of the first accommodation for the plurality of cables;
  wherein the at least one side part is provided with a longitudinally extending cable tray edge which protrudes and is directed with an angle γ away from at least one of the first support surface and the second support surface of the first accommodation; and
  wherein 70°≤γ≤270°.

6. The cable tray according to claim 1, further comprising: a tray bottom comprising the first support surface; and tray sides comprising side parts;
  wherein the tray bottom and/or the tray sides comprise first tray members extending at a first angle $\alpha_1$ towards a longitudinal direction of the cable tray and second tray members extending at a second angle $\beta_1$ towards the longitudinal direction of the cable tray;
  wherein the first tray members and the second tray members are permanently coupled to each other;
  wherein the first and second tray members together define the tray bottom and/or the tray sides; and
  wherein each of the first tray members and the second tray members is formed as a beam having a cross section in the form of a U-profile.

7. The cable tray according to claim 6, wherein an open side of the U-profiled beams is oriented away from the cable tray.

8. The cable tray according to claim 7, wherein a width of a smallest hole of the through holes has a width that is larger than a width of any of the first tray members and the second tray members.

9. The cable tray according to claim 6, further comprising: a flat bottom; and
  flat sides;
  wherein the flat bottom and/or flat sides comprises the first tray members and the second tray members.

10. The cable tray according to claim 6, wherein the through holes are each limited by two opposing first tray members and by two opposing second tray members.

11. The cable tray according to claim 10, wherein a size and a form of the through holes are identical for a main part of the through holes, particularly in the tray bottom.

12. The cable tray according to claim 10, wherein at least one of the through holes is provided with a cover member either as part of the beam or as an attached and demountable cover member.

13. The cable tray according to claim 6, wherein all of the first tray members and the second tray members have approximately the same cross sectional form and cross sectional size.

14. The cable tray according to claim 6, wherein the first tray members have a longitudinal elongation; and
  wherein the second tray members have a transverse elongation such that the first angle $\alpha_1$ is equal to approximately 0° and such that the second angle $\beta_1$ is equal to approximately 90°.

15. The cable tray according to claim 14, wherein at least one of the through holes is of a rectangular form with two opposing long sides and two opposing short sides.

16. The cable tray according to claim 6, wherein both the first tray members and the second tray members defining the cable tray are produced from one single piece of metal, preferably from a steel coil.

17. A method of manufacturing the cable tray of claim 1, for example for supporting electrical wires, wherein a flat metal sheet starting material comprises one side surface as a support side for the first accommodation, the flat metal sheet starting material being processed by the following steps:
  a) the flat metal sheet starting material being punched with the through holes, each of the through holes comprising the edge;
  b) bending the edge of each of the through holes the angle δ away from the first support surface, resulting in a formed material;
  c) bending the formed material an angle y towards the support side into a final form of the cable tray, i wherein 30°≤φ≤140°.

18. The method of manufacturing a cable tray according to claim 17, wherein, in step a) the flat metal sheet starting material is punched with holes which are separated by strips; and
  wherein, in step b) the strips are being formed into U-shaped beams defined as tray members.

19. The method of manufacturing a cable tray according to claim 17, wherein, in step c) the formed material is bent at a pre-defined angle along at least one bending line being parallel to a longitudinal direction of the cable tray.

20. A cable tray comprising:
  a first part comprising one piece having a uniform thickness, the first part forming at least a first support surface of a first accommodation for the plurality of cables, the first part having through holes each defined in part by an edge of the first part, the through holes including at least one enclosed through hole defined by a plurality of protruding edges enclosing the at least one enclosed through hole and protruding from the first support surface;
  wherein the edge protrudes from the first support surface and is directed with an angle δ away from the first support surface of the first accommodation;
  wherein 45°<δ<180°;

wherein the edge of at least one of the through holes is oriented at the angle δ from the first support surface;
wherein the edge of at least two adjacent through holes in the first part is orientated at the angle δ from the first support surface;
wherein the through holes are formed and located in relation to each other so that edges of two adjacent through holes define a tray member;
wherein the tray member is formed as a beam with longitudinally uniform cross shape; and
wherein the tray member is formed at least partly between adjacent located through holes.

\* \* \* \* \*